United States Patent [19]

Aso et al.

[11] Patent Number: 4,929,809

[45] Date of Patent: May 29, 1990

[54] WIRE DRIVE APPARATUS IN A WIRE-CUT ELECTRIC DISCHARGE MACHINE

[76] Inventors: Toshiyuki Aso, Room 7-208, Fanuc Manshonharimomi, 3539-1, Shibokusa; Yasuo Arakawa, Fanuc Dai3virakaramatsu, 3527-1, Shibokusa, both of Oshino-mura, Minamitsuru-gun, Yamanashi, 401-05, Japan

[21] Appl. No.: 340,293

[22] PCT Filed: Oct. 15, 1988

[86] PCT No.: PCT/JP88/01052

§ 371 Date: Apr. 13, 1989

§ 102(e) Date: Apr. 13, 1989

[87] PCT Pub. No.: WO89/03271

PCT Pub. Date: Apr. 20, 1989

[30] Foreign Application Priority Data

Oct. 15, 1987 [JP] Japan .................... 62-258271

[51] Int. Cl.⁵ .................... B23H 7/02; B65G 15/14; B65H 51/00
[52] U.S. Cl. .................... 219/69.12; 198/628; 226/172
[58] Field of Search .................... 219/69.12; 226/172; 198/627, 628

[56] References Cited

U.S. PATENT DOCUMENTS 3,610,500 10/1971 Brown .................................. 226/172
4,652,716 3/1987 Schneider et al. .............. 219/69.12
4,814,572 3/1989 Aso et al. ........................ 219/69.12

FOREIGN PATENT DOCUMENTS

58-28427 2/1983 Japan .
191926 12/1983 Japan .
641991 3/1984 Switzerland .................. 219/69.12
2075400 11/1981 United Kingdom ............. 219/69.12

Primary Examiner—Philip H. Leung
Assistant Examiner—Geoffrey S. Evans
Attorney, Agent, or Firm—Staas & Halsey

[57] ABSTRACT

A wire drive apparatus in a wire-cut electric discharge machine, which is capable of effecting wire extension smoothly even by a single drive source, and of preventing wear of belts and variation in wire feed speed. Upon wire extension, a lower belt section (3) pivotally supported through links (33, 34, 36, L) is moved toward an upper belt section (2) with actuation of air cylinders (10, 12), so that belts (21, 31) of these belt sections are brought in urged contact with each other, and a wire is delivered for the wire extension by the belts which are rotated, a wire drive roller (4). After completion of the wire extension, the lower belt section is moved to a position at which it is separated from the wire, and at this time the upper belt section is also separated from the wire, and power transmission from the wire drive roller to the lower belt section is disconnected.

11 Claims, 5 Drawing Sheets

WIRE DRIVE APPARATUS IN A WIRE-CUT ELECTRIC DISCHARGE MACHINE

TECHNICAL FIELD

The present invention relates to a wire drive apparatus for use in a wire-cut electric discharge machine, and more particularly, to a wire drive apparatus which is capable of effecting smooth wire extension by the use of a single drive source, and of avoiding wear of belts and variation in wire feed speed.

BACKGROUND ART

Figure 5:
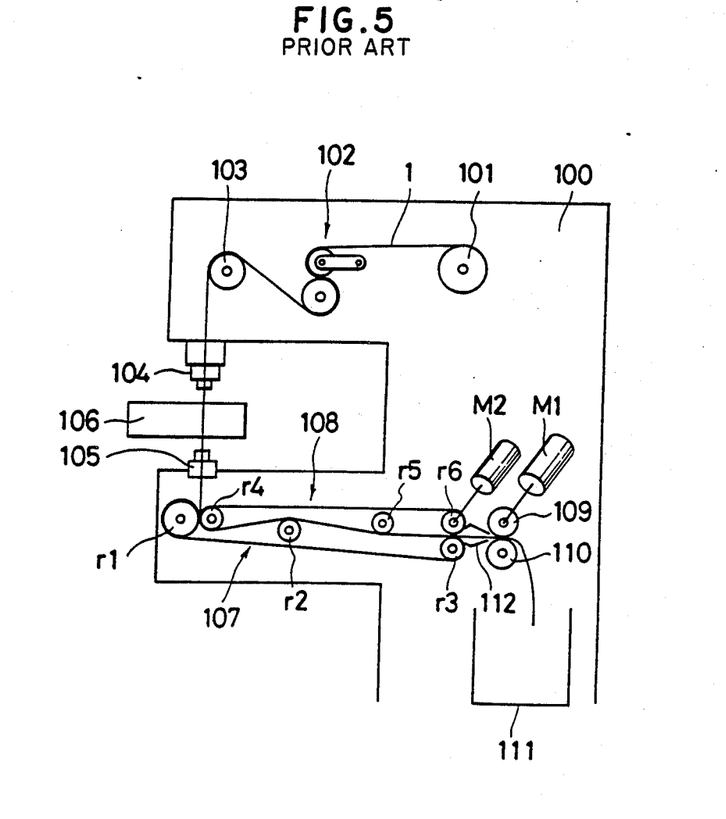
FIG. 5 is a schematic side view showing a wire-cut electric discharge machine equipped with a conventional wire drive apparatus.

Typically, a conventional wire-cut electric discharge machine comprises a wire feed/drive system shown in FIG. 5, and is so arranged as to generate electric discharge between a wire 1 and a workpiece 106 for electric discharge machining while the wire 1 wound around a wire reel 101 rotatably supported by a column 100 is delivered by means of the wire feed/drive system. This wire feed/drive system comprises a brake device 102 consisting of a brake shoe and a brake pinch roller, a guide roller 103, upper and lower guide sections 104, 105, and upper and lower belt sections 108, 107 for wire feed. The lower belt section 107 is comprised of rollers r1–r3 and a belt stretched between these rollers, and the upper belt section 108 is comprised of rollers r4–r6 and a belt stretched therebetween, the roller r6 being coupled to a motor M2. Further, the wire feed/drive system comprises a wire guide 112, a feed roller 109 connected to a motor M1, and a pinch roller 110 disposed in urged contact with this roller.

During wire extension, the wire 1 is fed manually or by means of an automatic wire extension apparatus (not shown) from the upper guide section 104 toward an initial hole or the like, not shown, formed in the workpiece 106, and is then directed from the initial hole toward the upper and lower belt sections 108, 107 through a wire feed path in the lower guide section 105. Further, the wire is delivered under a condition that it is held between the belts of the belt sections which move with rotation of the motor M2, to be held between the feed roller 109 and the pinch roller 110 after passing the wire guide 112. After completion of wire extension in this manner, electric discharge machining is started, with the feed roller 109 and the upper belt section 108 driven by the motors M1, M2, respectively, so as to deliver the wire 1 held between the roller 109 and the pinch roller 110 and between the belts of the upper and lower belt sections 108, 107. The used wire is then cast away into a wire recover box 111.

As explained above, according to the conventional wire feed/drive system, the wire 1 is driven by the rollers 109, 110 and by the belt sections 108, 107 during electric discharge machining. Moreover, in order to feed the wire 1 in a stable manner, the motors M1, M2, associated with these rollers and the belt sections, respectively, are rotated in synchronism with each other. Further, the belt of each belt section is constructed so that two opposite ends thereof are connected in an endless manner, and hence a stepped portion is formed at the junction. Therefore, the belt is liable to rotate unevenly. Thus, even though the feed roller 109 is rotated accurately at a predetermined speed during the electric discharge machining, the wire feed speed is liable to vary, thereby possibly entailing variation in electric discharge machining characteristics. Moreover, since the wire and the belts are held in contact with one another, the belts can be easily worn away, and the wire can vibrate.

DISCLOSURE OF THE INVENTION

The object of the present invention is to provide a wire drive apparatus for use in a wire-cut electric discharge machine, which is capable of effecting wire extension smoothly by the use of a single drive source, and preventing wear of a belt, variation in wire feed speed and occurrence of wire vibration.

In order to achieve the above-mentioned object, a wire drive apparatus according to the present invention, comprises: a pair of belt sections for wire feed each having a belt, the pair of belt sections being arranged to be movable relative to each other between a wire extension operation position where the belts are in urged contact with each other and a retracted position where the belts are out of contact with a wire; means for causing the relative movement of the pair of belt sections between the wire extension operation position and the retracted position; a pair of rollers disposed at locations downstream of the pair of belt sections for feeding the wire held therebetween; means for rotatively driving at least one of the pair of rollers; and means for operatively coupling the at least one roller with at least one of the pair of the belt sections during wire extension so that at least one of the belts is driven in synchronism with rotation of the at least one roller, and for releasing the operative coupling after completion of the wire extension.

As mentioned above, according to the wire drive apparatus of the present invention, since a rotary force of the wire feed rollers is transmitted to the wire feed belt so as to drive the same belt in synchronism with the roller rotation, smooth wire extension is achieved even by a single drive source. Moreover, since, after completion of wire extension, power transmission from the rollers to the belts is disconnected and the respective belt is retracted to the position where the belt is out of contact with the wire, wear of the belts, variation in wire feed speed, and vibration of the wire being traveled can be prevented.

BEST MODE OF CARRYING OUT THE INVENTION

Figure 1:
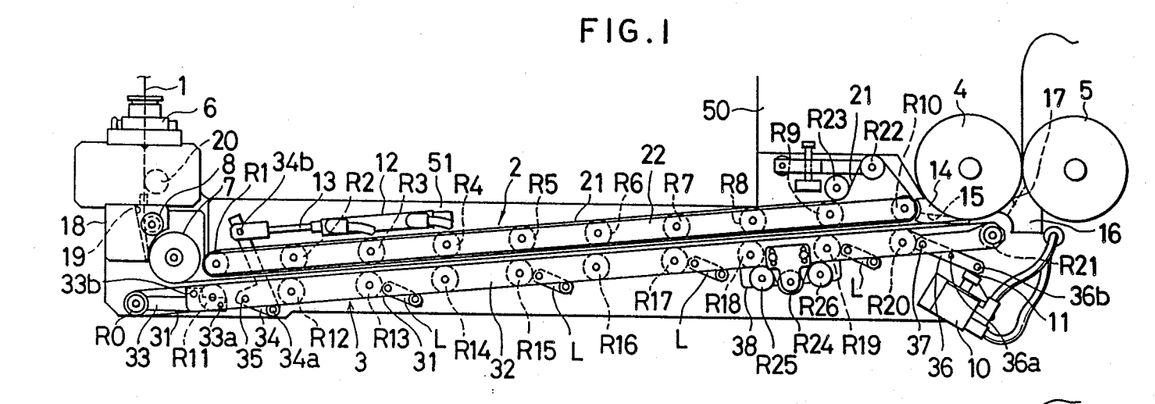
FIG. 1 is a fragmentary side view showing an essential part of a wire drive apparatus according to an embodiment of the present invention, with a lower belt section in its retracted position.
Figure 2:
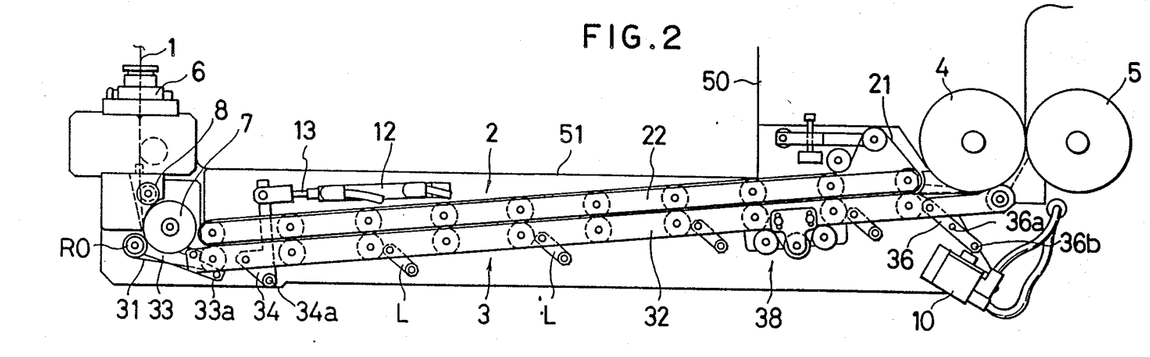
FIG. 2 is a side view showing the apparatus of FIG. 1, with the lower belt section in a wire extension operation position.
Figure 3:
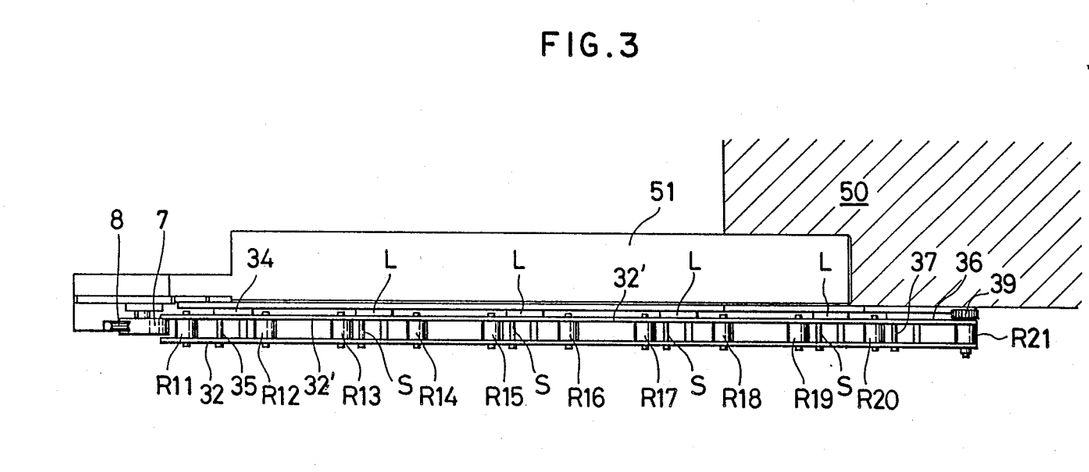
FIG. 3 is a top plan view showing the apparatus of FIG. 1, with an upper belt section eliminated.

A wire-cut electric discharge machine, equipped with a wire drive apparatus according to an embodiment of the present invention, is basically the same in construction as the electric discharge machine of FIG. 5. That is, as shown in FIGS. 1-3, the electric discharge machine comprises a column 50, a lower guide section 6, upper and lower belt sections 2, 3, a wire drive roller 4, and a pinch roller 5, respectively corresponding to the elements 100, 105, and 107-110, and comprises elements (not shown) respectively corresponding to the elements 101-104 of FIG. 5.

More specifically, a roller 8 with a V groove for guiding a wire 1 and a plain roller 7 are rotatably supported by a lower arm 51 extending from one side of the column 50 in the horizontal direction. The upper and lower belt sections 2, 3 are disposed at locations downstream of these rollers 7, 8. The upper belt section 2 comprises rollers R1-R10, a roller R23, a roller R22 for belt tension adjustment, and an endless belt 21 stretched between these rollers. Respective one ends of the rollers R1-R10, R22, R23 are rotatably supported by the lower arm 51, and respective other ends thereof are supported by a side plate 22. The lower belt section 3 comprises rollers R11-R21 rotatably supported between side plates 32 and 32', respectively, rollers R24-R26, a roller R0 rotatably supported by a link 33, mentioned later, and an endless belt 31 stretched between these rollers. The rollers R11-R20 are disposed in alignment with the rollers R1-R10 of the upper belt section 2, respectively. Further, the roller R24 is arranged to be urged by an appropriate means (not shown) such as a spring in the direction away from the upper belt section 2, and cooperates with the rollers R25 and R26 disposed at opposite sides of the same roller to form a belt tension adjusting device 38.

The lower belt section 3 is supported by the lower arm 51 through a plurality of links in such a manner that it is movable toward and away from the upper belt section 2 fixed to the lower arm 51. More specifically, the side plate 32' of the lower belt section 3 is coupled at its wire introduction side to an intermediate fulcrum of a link 33 through a shaft 33b an inner end of the link 33 is pivotally supported by the lower arm 51 through a shaft 33a. In other words, the lower belt section 3 is supported at its wire introduction side by the lower arm 51 through the link 33. The side plates 32, 32' of the lower belt section 3 are pivotally supported at their intermediate portions by the lower arm 51 through a plurality of intermediate links L whose respective one ends are fixed to shafts S extending through through holes (not shown) formed at intervals in the intermediate portions of the side plates. Further, the side plates 32, 32' of the lower belt section 3 are pivotally supported at their upstream and down stream side end portions by the lower arm 51 through links 34, 36 whose intermediate fulcrum or one end is fixed to a corresponding one of shafts 35, 37 extending through holes formed in the end portions of these plates. An inner end of the link 34 and an outer end of the link 36 are coupled to piston rods 13, 11 of air cylinders 12, 10 through shafts 34b, 36b, respectively.

Figure 4:
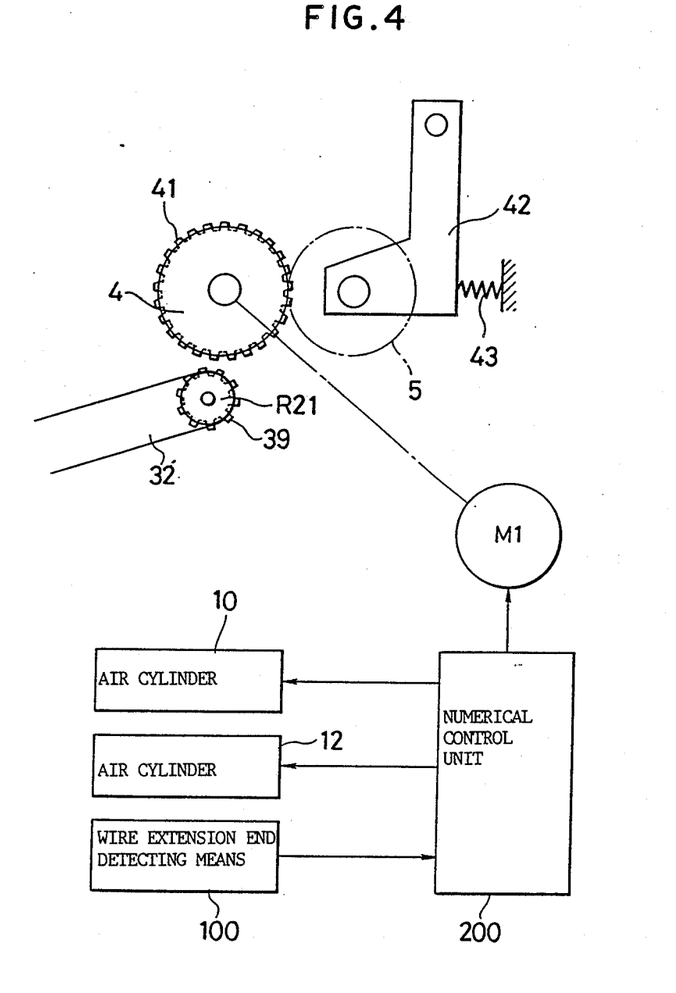
FIG. 4 is a schematic side view showing a power transmission mechanism interposed between a wire drive roller and the lower belt section, and peripheral elements.
Figure 6:
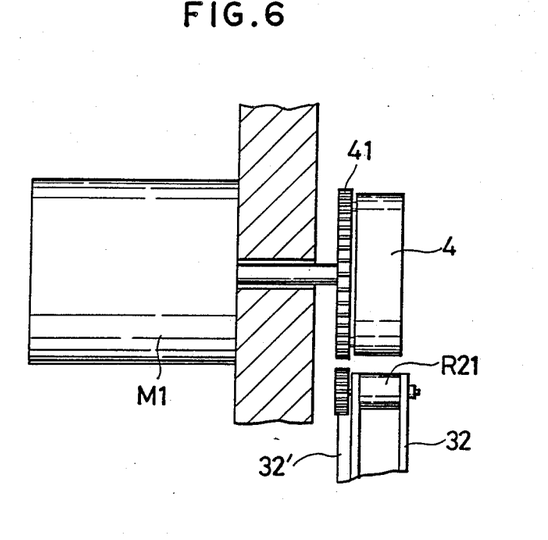
FIG. 6 is a fragmentary plan view corresponding to FIG. 4.

Disposed at locations downstream of the upper and lower belt sections 2, 3 are a wire drive roller 4 rotatably supported by the column 50, and a pinch roller 5. As shown in FIG. 4, the wire drive roller 4 has a roller shaft operatively coupled to a motor M1, and a gear 41 is fixed to this roller shaft for rotation in unison with the roller 4. Further, a gear 39 is fixed to a roller shaft of the roller R21 at a wire discharge side of the lower belt section 3 for rotation in unison with the roller R21, and is disposed for engagement with the gear 41 of the wire drive roller 4 (FIGS. 3, 4 and 6), so that operative coupling can be established and released between the roller 4 and the upper belt section 2. The pinch roller 5 is supported by a mounting member 42 which is urged by a spring 43 toward the roller 4 and has one end pivotally supported by the column 1, in such a state that the pinch roller is rotatable at another end of the mounting member and is in urged contact with the roller 4.

The wire drive roller 4, pinch roller 5, plain roller 7 and upper belt section 2 are so disposed as to establish therebetween such a positional relationship that the wire 1 is slightly separated from the belt 21 of the upper belt section 2 when the wire 1 is stretched between the plain roller 7 and the wire drive roller 4.

In the drawings, reference numeral 20 denotes an electric contact for supplying electric power to the wire 1; 19, a guide member for guiding the wire delivered from the lower guide section 6 toward the roller 8 with the V groove and the plain roller 7; and 18, a cover for enclosing the guide member 19. Reference numerals 14, 16 denote guide members which are respectively provided with guide pieces 15, 17 for guiding the wire 1 delivered from the upper and lower belt sections 2, 3 toward between the wire drive roller 4 and the pinch roller 5. Further, the air cylinders 10, 12, the motor M1, and a conventional wire extension end detecting means 100 are connected to control means, e.g., a numerical control unit 200 of the electric discharge machine. Where required, the electric discharge machine is equipped with a conventional automatic wire extension apparatus, not shown.

In the following, the operation of the wire drive apparatus of the wire-cut electric discharge machine will be explained.

First, the numerical control unit 200 causes the roller drive motor M1 to drivingly rotate, and actuates the air cylinders 10, 12. Upon actuation of the air cylinders 10, 12, the piston rods 11, 13 are retracted into the cylinders, so that the links 34, 36 are rotated clockwise in FIG. 1 around the shafts 34a, 36a, respectively. As a result, the lower belt section 3, which receives the shafts 37, 35 passing therethrough and movable in unison with the links 36, 34, is moved diagonally from its retracted position shown in FIG. 1 to the upper right in FIG. 1, i.e., toward the upper belt section 2 so as to reach its wire extension operation position, with a parallel relationship between opposite surfaces of the belts 21, 31 of the respective belt sections maintained. During this movement of the lower belt section 3, the plurality of intermediate links L and the most-upstream-side link 33 are rotated clockwise.

When the lower belt section 3 reaches its wire extension operation position, the belts 21, 31 of the upper and lower belt sections 2, 3 are brought in urged contact with each other with the aid of the rollers R1-R20 of the belt sections, and the belt 31 is brought in urged contact with the plain roller 7 and the wire drive roller 4 at locations where the wire-introduction-side roller R0 fixed to a tip end of the link 33 and the wire-discharge-side roller R21 are disposed. At the same time, the gear 39 integral with the roller 21 is brought in mesh with the gear 41 which is integral with the roller 4, so that the rotation of the roller 4 driven by the motor M1 is transmitted to the roller R21 through the gears 41, 39. As a result, the belt 31 stretched between the rollers R0, R10-R20 and R24-R26, and the belt 21 which is in urged contact with the former belt travel in synchronism with the rotation of the wire drive roller 4.

Next, the wire 1, is fed from the wire supply reel by means of the automatic wire extension apparatus (not shown), or manually, and is directed to the lower guide section 6 after passing the electric discharge machining region, and then delivered from the lower guide section 6, where it is guided by means of the guide member 19 and the roller 8 with a V groove, so as to reach a position at which the plain roller 7 is in urged contact with the roller R0 through the belt 31. The wire 1 is then held between the plain roller 7 and the belt 31, and starts its movement with travel of the belt 31. Next, the wire 1 is held between the belt 31 and the plain roller, and is then held between the belts 21, 31, and moved therewith. After passing between the rollers R10, R20, the tip end of the wire 1 is guided by the guide piece 15 and is held between the belt 31 and the wire drive roller 4. Next, the wire 1 is guided by the guide piece 17, and held between the wire drive roller 4 and the pinch roller 5.

When the wire extension end detecting means 100 detects the wire 1 being held between the wire drive roller 4 and the pinch roller 5, the numerical control unit 200 deenergizes the air cylinders 10, 12. As a result, the links 34, 36 are rotated anticlockwise, so as to cause the lower belt section 3 to diagonally move to the lower left from its wire extension operation position of FIG. 2 to its retracted position of FIG. 1.

When the lower belt section 3 reaches the retracted position, the urged contact state between the belts 21, 31 is released, and the wire 1 is stretched between the plain roller 7 and the wire drive roller 4. Since the belt 21 of the upper belt section 2 is located so as to be out of contact with the wire stretch line extending between the plain roller 7 and the wire drive roller 4, the wire 1 does not contact the belt 21. Moreover, the belt 31 of the lower belt section 3 is moved downward to a position at which the belt 31 is out of contact with the wire 1. Accordingly, the belt 31 also does not contact the wire 1. In addition, with the downward movement of the lower belt section 3, the belt tension adjusting device 38 operates to absorb any flexure of the belt 31, which occurs while the link 33 is changed from the state shown in FIG. 2 to the state of FIG. 1. Accordingly, the belt 31 is prevented from being in contact with the wire 1 due to flexure of the belt. As a result, the wire 1 is fed smoothly during the electric discharge machining after the wire extension.

In the above-mentioned embodiment, the belts 21, 31 of the upper and lower belt sections are disposed so that their belt surfaces extend substantially in the horizontal direction. Alternatively, these belt surfaces may extend in the vertical direction for delivery of the wire 1 held therebetween. In this case, a guide member, rollers and the like may be provided for guiding the wire 1 from the plain roller 7 to the belt sections 2, 3, and from these belt sections to the wire drive roller 4, where required.

We claim:

1. A wire drive apparatus in a wire-cut electric discharge machine, comprising:
    a pair of belt sections for feeding a wire and each having a belt, said pair of belt sections being arranged to be movable relative to each other between a wire extension operating position where said belts are in contact with each other and a retracted position where said belts are out of contact with said wire;
    means for causing the relative movement of said pair of belt section between said wire extension operating position and said retracted position;
    a pair of rollers disposed downstream from said pair of belt sections for feeding said wire held therebetween;
    means for rotatively driving at least one of said pair of rollers; and
    means for establishing the operative coupling of said at least one rotatively driven roller with at least one of said pair of belt sections during wire extension so that at least one of said belts is driven in synchronism with rotation of said at least one rotatively driven roller, and for releasing the operative coupling after completion of the wire extension.

2. A wire drive apparatus in a wire-cut electric discharge machine according to claim 1, wherein one of said belt sections is immovable, and the other of said belt sections is disposed for movement toward and away from said one belt section.

3. A wire drive apparatus in a wire-cut electric discharge machine according to claim 2, wherein each of said belt sections has a plurality of rollers between which an endless belt serving as said belt is stretched.

4. A wire drive apparatus in a wire-cut electric discharge machine according to claim 3, wherein said means for establishing and releasing the operative coupling includes a first gear driven by said rotatively driving means and mounted on one of said pair of rollers for rotation in unison therewith, and a second gear adjacent to said one roller and mounted on one of said plurality of rollers of said other belt section for rotation in unison therewith, said second gear being arranged to be in mesh with said first gear when said other belt section is in said wire extension operation position.

5. A wire drive apparatus in a wire-cut electric discharge machine according to claim 3, further including:
    a guide roller disposed at a location upstream of said pair of belt sections for guiding said wire; and
    wherein said endless belt of one belt section and said endless belt of said other belt section when in said retracted position are separated from said wire when said wire is stretched between said guide roller and said pair of rollers.

6. A wire drive apparatus in a wire-cut electric discharge machine according to claim 3, wherein said plurality of rollers of said belt sections are so disposed that corresponding rollers of each section are in alignment with each other and maintain said endless belts in contact with each other when said belt sections are in a wire extension operating position.

7. A wire drive apparatus in a wire-cut electric discharge machine according to claim 5, wherein a roller on the most upstream end of said other belt section is brought into contact with said guide roller and a roller on the most downstream end of said other belt section is brought into contact with said one of said pair of rollers when said other belt section is in said wire extension operating position.

8. A wire drive apparatus in a wire-cut electric discharge machine according to claim 4, further including:
    a guide roller disposed at a location upstream of said pair of belt sections for guiding said wire; and
    wherein said endless belt of one belt section and said endless belt of said another belt section when in said retracted position are separated from said wire when said wire is stretched between said guide roller and said pair of rollers.

9. A wire drive apparatus in a wire-cut electric discharge machine according to claim 4, wherein said plurality of rollers of said belt section are so disposed that corresponding rollers of each section are in alignment with each other and maintain said endless belts in contact with each other when said belt sections are in a wire extension operating position.

10. A wire drive apparatus in a wire-cut electric discharge machine according to claim 1, wherein said means for causing relative movement of said belt sections comprises cylinder and piston means.

11. A wire drive apparatus in a wire-cut electric discharge machine according to claim 1, which includes wire extension end detecting means for detecting when said wire is held between said pair of rollers.

* * * * *

UNITED STATES PATENT AND TRADEMARK OFFICE
CERTIFICATE OF CORRECTION

PATENT NO. : 4,929,809

DATED : May 29, 1990

INVENTOR(S) : TOSHIYUKI ASO et al.

It is certified that error appears in the above-identified patent and that said Letters Patent is hereby corrected as shown below:

FRONT PAGE - [57] ABSTRACT, line 11, "rotated," should be --rotated by--.

Column 3, line 40, "33b an" should be --33b. An--;

line 52, "down stream" should be --downstream--.

Signed and Sealed this

Eighth Day of October, 1991

Attest:

HARRY F. MANBECK, JR.

*Attesting Officer*  *Commissioner of Patents and Trademarks*